(12) United States Patent
Wang et al.

(10) Patent No.: US 7,334,316 B2
(45) Date of Patent: Feb. 26, 2008

(54) METHOD OF SEALING A GENERATOR STATOR BAR AND A STATOR BAR END FITTING

(75) Inventors: Yu Wang, Clifton Park, NY (US); Jeffrey Michael Breznak, Waterford, NY (US); Lawrence Lee Sowers, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 449 days.

(21) Appl. No.: 10/900,184

(22) Filed: Jul. 28, 2004

(65) Prior Publication Data
US 2006/0021212 A1 Feb. 2, 2006

(51) Int. Cl.
*H02K 15/00* (2006.01)
(52) U.S. Cl. .................. 29/596; 29/402.03; 29/402.08; 29/402.16; 29/598; 29/603.25; 219/85.18; 219/129; 219/400; 310/54; 310/254
(58) Field of Classification Search ............ 29/596, 29/402.03, 402.08, 402.16, 598, 603.25; 219/85.18, 129, 400; 310/54, 254
See application file for complete search history.

(56) References Cited
U.S. PATENT DOCUMENTS

| | | | |
|---|---|---|---|
| 3,614,493 A | 10/1971 | Collings et al. | 310/54 |
| 3,978,359 A | 8/1976 | Kultzow et al. | 310/260 |
| 4,066,203 A | 1/1978 | Davies | |
| 4,199,700 A | 4/1980 | Daugherty et al. | 310/71 |
| 4,274,021 A | 6/1981 | Kamiya et al. | 310/54 |
| 4,629,917 A | 12/1986 | Brem | |
| 4,806,807 A | 2/1989 | Levino | 310/71 |
| 4,912,831 A | 4/1990 | Levino | 29/596 |
| 4,982,122 A | 1/1991 | Rowe et al. | 310/54 |
| 5,423,473 A | 6/1995 | Dailey et al. | 228/44 |
| 5,528,827 A | 6/1996 | Dailey et al. | 29/890 |
| 5,557,837 A | 9/1996 | Thiard-Laforet et al. | 29/596 |
| 5,581,869 A | 12/1996 | Travaly | 29/596 |
| 5,605,590 A | 2/1997 | Manning et al. | 156/94 |
| 5,659,944 A | 8/1997 | Thiard-Laforet | 310/54 |
| 5,760,371 A * | 6/1998 | Dailey et al. | 219/129 |
| 5,809,632 A | 9/1998 | Champagne et al. | |
| 5,875,539 A | 3/1999 | Kilpatrick | 29/596 |
| 6,642,485 B2 * | 11/2003 | Goenka et al. | 219/400 |

* cited by examiner

*Primary Examiner*—Tim Phan
(74) *Attorney, Agent, or Firm*—Nixon & Vanderhye P.C.

(57) ABSTRACT

A method of sealing a generator stator bar and a stator bar end fitting receiving the end including the steps of: brazing the fitting to the end of the stator bar with a braze material; applying a metallic barrier coating material to the end of the stator bar in the fitting; heating the fitting at a temperature at least as hot as a liquidus temperature of the metallic coating material and cooler than a solids temperature of the braze material; coating the end of the stator bar in the fitting with liquid metallic barrier coating material, and solidifying the liquefied metallic coating material to form a metallic barrier coating on the end of the stator bar in the fitting.

12 Claims, 3 Drawing Sheets

METHOD OF SEALING A GENERATOR STATOR BAR AND A STATOR BAR END FITTING

BACKGROUND OF THE INVENTION

The present invention relates to seals between generator stator bars and their end fitting connections, and to a method for sealing a stator bar end fitting to prevent or reduce corrosion due to coolant water flowing through the fitting and the stator bar.

Water-cooled stator bars for electrical generators are comprised of a plurality of small rectangular solid and hollow copper strands brazed to one another to form a bar. The ends of the strands are brazed to an end fitting, typically referred to as stator bar clip. The end fitting serves as both an electrical and a cooling flow connection for the stator bar.

The hollow end fitting typically includes an enclosed chamber for ingress or egress of stator bar cooling liquid, typically deionized water. At one open end, the end fitting receives the ends of the strands of the stator bar. The fitting and the peripherally outermost copper strands of the stator bar are brazed to one another. The opposite end of the fitting is connected to a stator cooling conduit, e.g., a house.

Over time, leaks can developed about the connection between the stator bar ends and the stator bar fitting as well as between adjacent strands. It is believed that the leak mechanism is due to a two-part corrosion process which initiates in the braze alloy at the interior surface of the braze joint. Stagnant water in the chamber of the fitting has in the past been in contact with the braze alloy and the copper strands. This coolant contact with the braze joint and cooper strands is believed to cause corrosion and consequent leakage.

Field repair of coolant leaks through the stator bar end connections has been moderately successful. A leak site is identified by external visual examination of where the strands enter the end fitting. External visual leak detection indirectly identifies the leak site because the visible external leak on the outside of the bar and/or fitting may be a considerable distance away from a point within the fitting where the leak begins. This is particularly true if the leak is occurring between the strands of the stator bar.

Once a leak is identified by visible inspection, a vacuum is drawn inside the fitting and stator bar. An anaerobic cement is applied externally or reflow the braze material around the suspected leak sites. The vacuum suction draws the cement inwardly towards the leak path. However, it has been found that this cement repair method is not 100% effective in repairing the leak and is therefore considered only a temporary repair.

As an alternative to applying cement to seal a leak, an epoxy barrier coating has been applied to provide protection against water initiated corrosion mechanisms along the brazed length of the strand package. The epoxy barrier coating technique is disclosed in U.S. Pat. No. 5,605,590. The epoxy barrier coating has been an improvement over earlier corrosion protection techniques. However, the epoxy barrier coating may deteriorate when exposed to extreme temperatures and can be difficult to inspect in certain stator clip designs.

There is a need for an improved barrier coating for stator bar clips. In particular there is a need for corrosion protection between the stator bars and their clips. The corrosion protection should be robust and be applicable to various stator bar clip designs, including clips for raised hollow strand stator designs.

BRIEF DESCRIPTION OF THE INVENTION

The invention may be embodied as a method of sealing a generator stator bar and a stator bar end fitting receiving the end including the steps of: attaching the fitting to the end of the stator bar with a braze material; applying a metallic barrier coating material to the end of the stator bar in the fitting; heating the fitting at a temperature at least as hot as a liquidus temperature of the metallic coating material and cooler than a solids temperature of the braze material; coating the end of the stator bar in the fitting with liquid metallic barrier coating material, and solidifying the liquefied metallic coating material to form a metallic barrier coating on the end of the stator bar in the fitting.

The invention may also be embodied as a method of sealing a stator bar end to a stator bar end fitting, the fitting having a chamber for receiving a liquid through an opening and in communication with hollow strands in said stator bar to enable coolant liquid flow through the hollow strands, said method comprising: brazing the fitting to the end of the stator bar; inserting a metallic barrier coating material into the chamber of the fitting; liquefying the metallic barrier coating material by heating the material to a temperature at least as hot as a liquidus temperature of the coating material; coating the end of the stator bar in the fitting with the liquefied metallic barrier coating material, and solidifying the liquefied metallic barrier coating material to form a barrier over the end of the stator bar in the fitting, wherein said hollow end strands comprise end openings extending through the barrier.

The invention may also be embodied as a fitting for a stator bar of a generator comprising: a fitting housing having a collar at a first end and a cooling fluid coupling at an opposite end, wherein said collar is configured to be brazed to an end of the stator bar; a chamber extending from the first end to the opposite end of the fitting, and a metallic barrier coating on an end of the stator bar in said chamber and forming a seal between the end and a remaining portion of the chamber, wherein said metallic barrier coating has a liquidus temperature lower than a solids temperature of a braze material applied to braze the stator bar to the fitting.

BRIEF DESCRIPTION OF THE DRAWINGS

FIG. 3 illustrates a barrier coating that has been applied to the end of the bar within the fitting such that hollow strands of the bar extend through the coating, and that the coating otherwise seals the bar end and braze from the coolant.

DETAILED DESCRIPTION OF THE INVENTION

Figure 1:
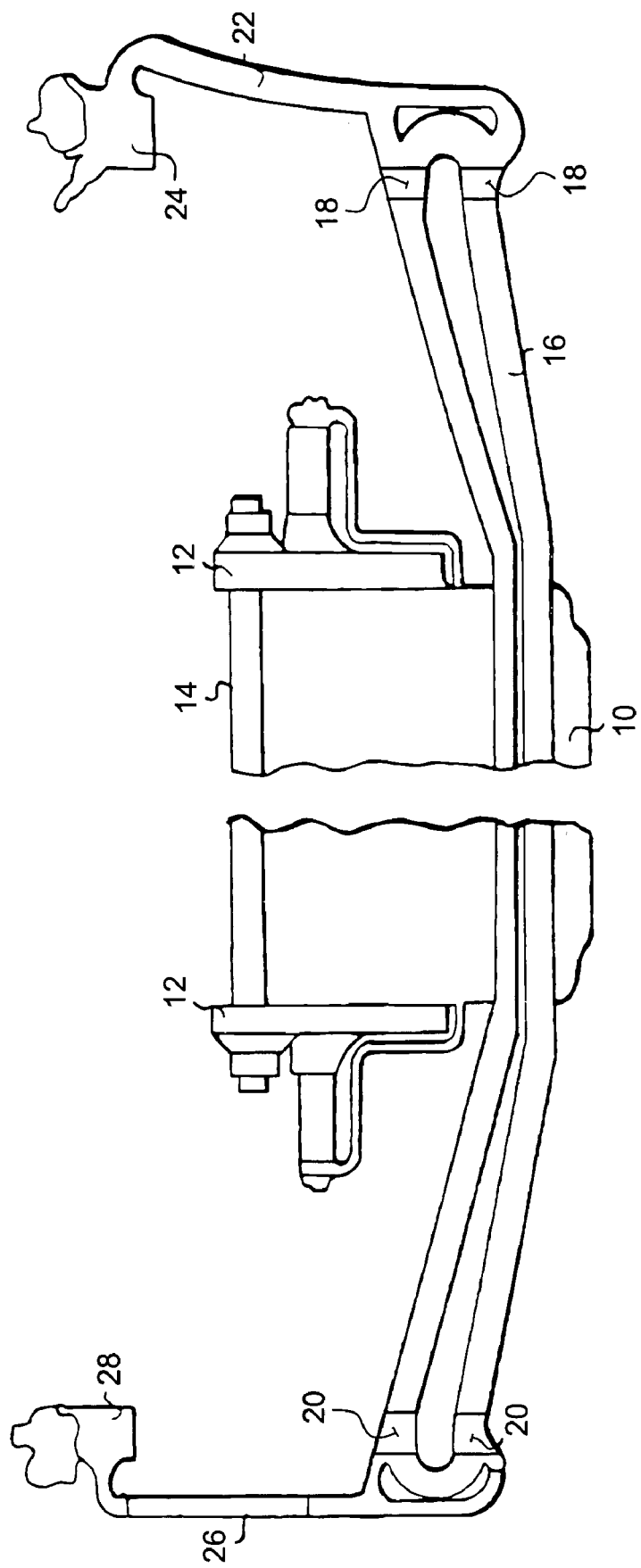
FIG. 1 is a schematic illustration of a liquid-cooled stator winding arrangement illustrating the stator bars and end fittings coupled to inlet and outlet coolant headers.

FIG. 1 illustrates a liquid-cooled stator winding arrangement used in a typical liquid-cooled generator. A stator core 10 having stator core flanges 12 and core ribs 14. Stator bars 16 pass through radially extending slots and terminate at opposite ends in end fittings 18 and 20. Inlet hoses 22 connect the inlet fitting 18 to an inlet coolant header 24. Outlet hoses 26 connect the outlet fitting 20 to an outlet coolant header 28.

Figures 2, 3:
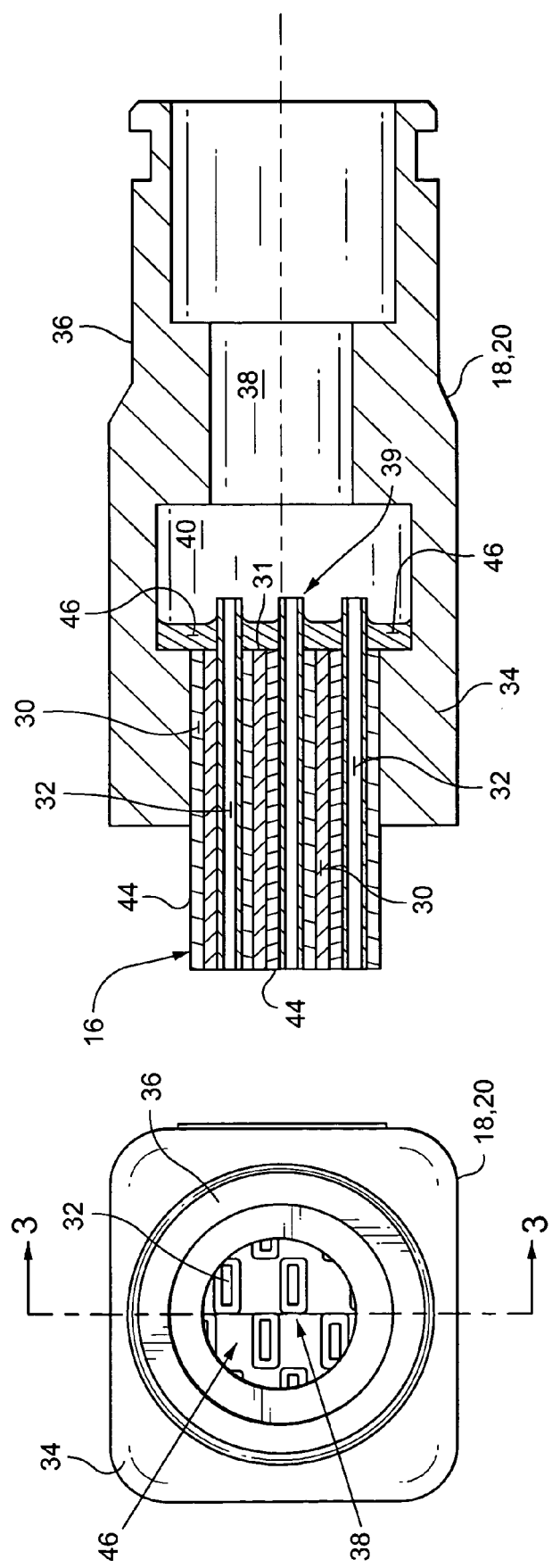
FIG. 2 is a representative end cross-sectional view of the strands of a stator bar within an end fitting.
FIG. 3 is an enlarged cross-sectional view of a stator bar end fitting taken along line 3-3 in FIG. 2.
Figure 4:
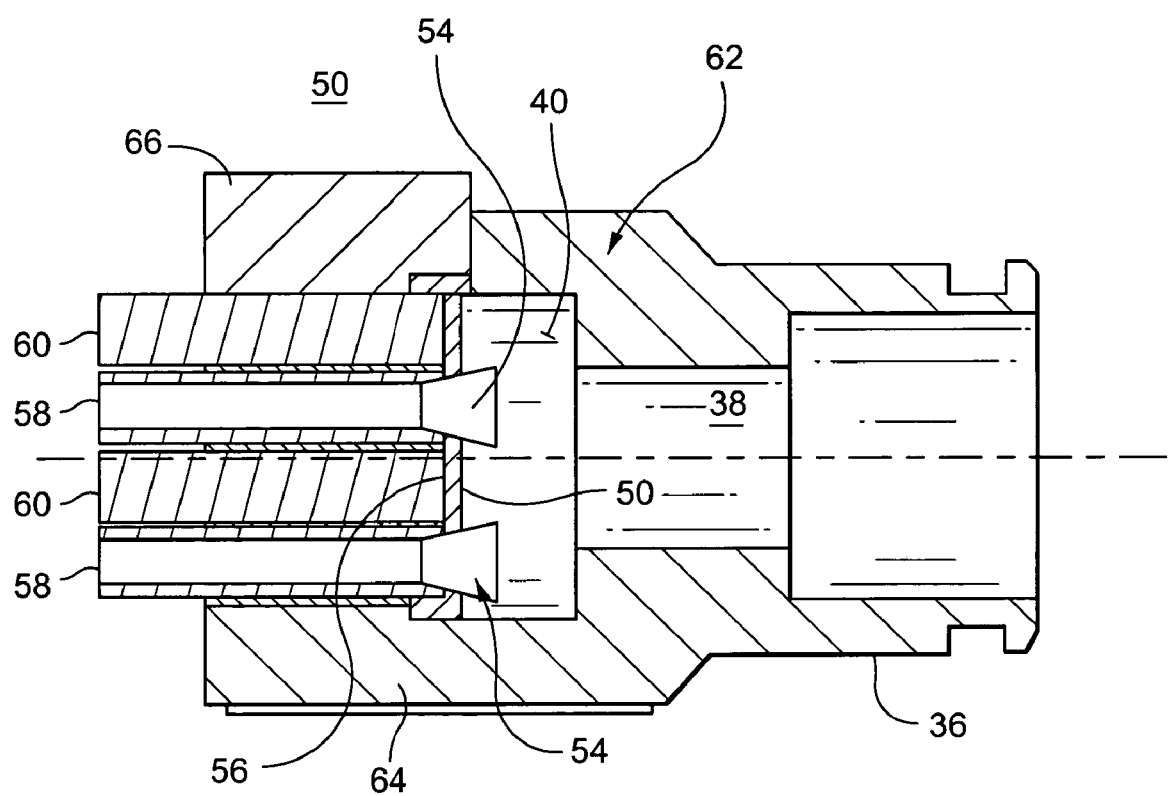
FIG. 4 is an enlarged cross-sectional view of a stator bar end and a fitting, wherein inserts are in the open ends of hollow end strands and the inserts extend through the metallic barrier coating in the fitting.

FIG. 2 is an end view of a stator bar and one of the stator bar fittings 18, 20. FIG. 3 is a cross-sectional side view of the end of the stator bar and its end fitting. Each stator bar includes a plurality of solid and hollow copper strands 30 and 32, respectively, disposed in side-by-side and superposed relation one to the other along the length of the bar. The strands are brazed to one another. The ends of the strands form the end 31 of the stator bar. The inlet fitting 18 and an outlet fitting 20 are brazed to opposite ends of the stator bar 16.

The strands 30, 32 are brazed to one another, as well as to the inside walls of the end fitting. The brazing material 44 is for example BCuP-5 and/or BCuP-1. The strands are also brazed to one another within the stator bar. It is believed that the initiation of the leakage paths is caused by stagnant coolant liquid in the sub-chamber 40 of the fitting which corrodes the end of the stator bar.

The end fittings 18, 20 are each formed of an electrically conductive material, such as copper. The fitting (also referred to here as a "stator bar clip") is hollow and includes a collar 34 that slides over the outer side surfaces of the end 31 of the stator bar 16. Opposite to the collar, the fitting includes a coupling end 36 that is configured to connect to one of the cooling hoses 22, 26.

The coupling end 36 of the end fitting is normally connected to and closed by a copper hose tube 22, 26 which serves as both an electrical connection and as a hydraulic conduit. Liquid coolant, e.g., deionized water, flows through the tubes 22, 26 into or from the internal chamber 38 defined by the fitting 20 and the exposed ends 39 of the hollow copper strands 32. The liquid in the chamber 38 flows into a first fitting, through the hollow strands 30 and out an opposite fitting. The opposite end fittings 18, 20 comprise an inlet fitting or receives the liquid coolant from the hollow strands 30 for egress when the fitting is employed as an outlet fitting.

Each end fitting 18, 20 includes an internal chamber 38 generally coaxial with the fitting and extending the length of the fitting. The chamber 38 includes an expanded sub-chamber 40 adjacent to the end 31 of the stator bar, a necked down section and a second expanded sub-chamber configured to receive an end of a hose. The external and internal shapes of a fitting may vary to suit different stator bar configurations.

To install an end fitting 18, 20 on a stator bar end, the bar ends are solidified and brazed to the collar of the fitting. A conventional high-temperature phosphorus copper braze alloy, e.g., BCuP-1, may be applied to the braze the end of the bar to the fitting when the bar is held horizontally or vertically. A BCuP-5 braze alloy may be applied to the joint between the end fitting and stator bar to seal the fitting to the strand ends. A conventional high temperature phosphorus copper braze material, e.g., BCuP-5, may be used to seal the collar of the clip to the strand ends of the stator bar.

Typically, a BCuP-5 braze alloy has a solids temperature of 1190° Fahrenheit-F. (643° Celsius-C.), a liquidus temperature of 1475° F. (802° C.) And a brazing range of 1300° F. to 1500° F. (704° C. to 816° C.). Typically, a BCuP-1 braze alloy has a solids temperature of 1310° Fahrenheit-F. (710° Celsius-C.), a liquidus temperature of 1688° F. (920° C.) And a brazing range of 1454° F. to 1724° F. (790° C. to 940° C.). A solids is a temperature below which the braze is solid and a liquidus is a temperature above which the braze is entirely liquid.

When the bar is brazed to the end fitting, the ends of the solid cooper strands 32 are generally flush with a back wall of the expanded sub-chamber 40. The ends 39 of the hollow cooper strands extend partially into the sub-chamber 40. The ends 39 of the hollow cooper strands 30 may extend about 10 to 500 mils beyond the ends of solid strands 32 and into the sub-chamber 40.

The end 31 of the stator bar is sealed with a metallic barrier coating 46 to prevent coolant corrosion. The coating is applied after the fitting is brazed to the stator bar and a braze seal is applied to the joint between the fitting and bar. The metallic barrier coating seals the end of the stator bar without blocking the openings 39 to the hollow strands and thereby allows coolant to flow through the fitting and the hollow strands. The coating material 46 forms a barrier across the sub-chamber 40 that prevents the coolant from corroding the end of the stator bar.

The metallic barrier coating material 46 may be a low-liquidus, corrosion resistant braze alloy or solder material. A tin-silver-copper alloy solder, and in particular Sn/3.8Ag/0.7Cu, is suitable as a coating material. The coating material 46 is selected such that its liquidus temperature is lower than the solids temperature of the braze alloy(s) used to both braze the copper strands together and to braze the fitting to the end of the stator bar. For example, the liquidus of the coating material may be in a range between 150° C. to 600° C., which is below the 643° C. solids of a BCuP-5 braze alloy applied to bond the end fitting to the stator bar. The coating material when applied to the fitting and bar end may be in the form of a paste, powder, chips or other small size form.

After being brazed together, the stator bar fitting and stator bar are oriented vertically. This orientation places the end surface of stator bar and the ends of the strands are horizontal and the coupling end 36 of the fitting is upright. The metallic barrier coating material 46 is initially inserted in a solid or liquid form through the coupling end 36 of the fitting, into the sub-chamber 40 and on the end of the stator bar. The coating material is applied over the solid strands 32 end surfaces and around the ends 31 of the hollow strands 30 to form a coating over the end of the stator bar in the clip.

A bore scope or other inspection instrument may be inserted into the chamber 40 so that a technician may view the end of the stator bar and the coating material to confirm that the coating material is at the bottom of the sub-chamber 40 and on the stator bar, and that the ends of the hollow strands extend up through the coating. This inspection may be accomplished when the coating material is initially inserted into the fitting and/or after the coating material has been liquefied and solidified on the end of the bar.

Heating the coating material, end of stator bar and fitting to a temperature above the liquidus temperature of the coating material, e.g., 5 degrees Celsius higher, causes the coating material 46 to liquefy and form a barrier coating over the end surface 31 of the bar in the fitting. Because the stator bar end 31 is horizontal, the liquefied coating material forms a pool over the end of the bar and at the bottom of the sub-chamber 40. The depth of the pool is less than the height of the ends of the hollow strands, e.g., the coating material pool is less than 10 to 500 mils. The hollow end strands protrude above the surface of the pool of the coating material. When the coating cools, the liquid coating material solidifies as a metallic barrier coating over the end of the stator bar.

The coating 46 forms a metallic barrier 46 over the end of the stator and within the sub-chamber 40 of the fitting. The coating 46 seals potential leakage paths within the fitting. The coating serves as a seal between the liquid coolant and the cooper strands and brazing alloy applied to the strands.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of sealing a stator bar end to a stator bar end fitting, the fitting having a chamber for receiving a liquid through an opening and in communication with hollow strands in said stator bar to enable coolant liquid flow through the hollow strands, said method comprising:
    brazing the fitting to the end of the stator bar;
    inserting a metallic barrier coating material into the chamber of the fitting;
    liquefying the metallic barrier coating material by heating the material to a temperature at least as hot as a liquidus temperature of the coating material;
    coating the end of the stator bar in the fitting with the liquefied metallic barrier coating material, and
    solidifying the liquefied metallic barrier coating material to form a barrier over the end of the stator bar in the fitting, wherein said hollow end strands comprise end sections extending through and beyond the barrier.

2. The method of claim 1 wherein brazing the fitting comprises brazing the fitting and stator bar with a phosphorus copper braze alloy and the coating material comprises a solder material.

3. The method as in claim 1 wherein brazing the fitting comprises brazing with at least one of a BCuP-5 or BCuP-1 phosphorus copper braze alloy, and the metallic coating comprises a tin-silver-copper solder material.

4. The method as in claim 1 wherein brazing the fitting comprises brazing with a BCuP-5 phosphorus copper braze alloy and the metallic coating comprises a tin-silver-copper solder alloy material.

5. The method as in claim 1 wherein the fitting is brazed with a braze alloy having a solids temperature of no lower than 710 degrees Celsius and the metallic coating material has a liquidus temperature no hotter than 600 degrees Celsius.

6. The method as in claim 1 wherein the fitting is oriented vertically and the end of the stator bar in horizontal during the step of coating the end of the stator bar with liquid metallic baffler coating material.

7. The method as in claim 1 wherein the end sections of the hollow strands comprise open ends of the hollow strands extending beyond ends of solid strands of the bar, and the liquid metallic coating covering the ends of the solid strands and said end openings of the hollow strands extend above the liquid metallic coating.

8. The method as in claim 1 wherein the end sections of the hollow strands comprise an insert in each of an open end of the hollow strands, and each insert extends above the liquid metallic coating.

9. The method as in claim 8 wherein the inserts are ceramic.

10. The method as in claim 1 wherein the coating material is applied to the end of the stator bar through a coupling end of the fitting.

11. The method as in claim 1 wherein the coating material is applied to the end of the stator bar as a solid.

12. The method as in claim 11 wherein the coating material is applied as at least one of a paste, a powder, metallic chips and metallic shavings.

* * * * *

UNITED STATES PATENT AND TRADEMARK OFFICE
CERTIFICATE OF CORRECTION

PATENT NO. : 7,334,316 B2  Page 1 of 1
APPLICATION NO. : 10/900184
DATED : February 26, 2008
INVENTOR(S) : Yu Wang et al.

It is certified that error appears in the above-identified patent and that said Letters Patent is hereby corrected as shown below:

At column 2 lines 10 and 40; at column 3 lines 61 and 65; at column 4 lines 1, 26 and 30; and at column 6 line 6 delete the word "solids" and insert the word --solidus--

At column 6 line 14 delete the word "baffler" and insert the word --barrier--

Signed and Sealed this

First Day of July, 2008

JON W. DUDAS
*Director of the United States Patent and Trademark Office*